Patented Mar. 9, 1943

2,313,504

UNITED STATES PATENT OFFICE 2,313,504

SULPHYDRYL COMPOUND OBTAINED FROM FLOUR

Arnold K. Balls, Washington, D. C., and Walter S. Hale, Alexandria, Va., assignors to Claude R. Wickard, as Secretary of Agriculture of the United States of America, and his successors in office No Drawing. Application October 24, 1942, Serial No. 463,261

7 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a continuation in part of our copending application for patent, Serial No. 343,564, filed July 2, 1940.

The object of this invention is to obtain sulphydryl compounds from flour. These sulphydryl compounds may be used as oxidizing and reducing agents depending on their original state of oxidation or reduction, and they are especially useful for this purpose as substitutes for cystine and cysteine.

It is well known that the use of sulphydryl compounds in medicine and industry is based on their chemical reactivity and particularly on their property of forming or entering into oxidation-reduction systems.

We have discovered the presence of sulphydryl-bearing compounds in grain flours, such as wheat, rye, corn, oat, and malt flours, as well as lima bean flour, cottonseed-meal, and peanut flour. These compounds may be extracted from any of these flours by treatment with a fat solvent, such as petroleum ether and ether, and this invention is directed to a method whereby sulphydryl compounds may be obtained from these flours.

Our method consists substantially of extracting the flour with petroleum ether, then removing the solvent by distillation or evaporation, thence dissolving the resulting residue by subjecting it to the action of ether and thence finely precipitating the sulphydryl-bearing fraction with a solvent, such as, for example, acetone or ethyl acetate. We may also employ a slightly acidulated ethyl alcohol as the precipitating agent. We have also found that hydrochloric acid may be used to acidulate the alcohol. When our product is obtained by the use of acetone or ethyl acetate as the precipitating agent, it contains lipoids or fats. We have found that when our resulting product is obtained by the use of an alcohol precipitation, it is nearly lipoid and fat free and is made wholly so by washing with alcohol and ether. After precipitation by acid alcohol the material is insoluble in ether and petrol ether, but it forms an apparent solution in water. The acetone precipitated material is insoluble in water but soluble in higher alcohols, such as amyl alcohol; the acid alcohol precipitate is soluble in water but not appreciably in alcohols higher than methyl alcohol.

Our product produced by either of the aforementioned processes carries a reversibly oxidizible and reducible sulphur. After acid hydrolysis this sulphur gives the reaction of sulphur in cystine or cysteine. The sulphur is attached to a nitrogen-bearing fragment having properties substantially the same as those of higher peptides.

When precipitated with acid alcohol and washed with alcohol and ether, our product contains one free amino group for every eight nitrogen atoms. Our product may be identified as an octapeptide, or a multiple thereof. It slowly dialyzes through Cellophane. It does not precipitate in warm 2.5 percent trichloroacetic acid. The molecular weight of the sulphur-bearing peptide-like fragment of the original complex may be between one and five thousand. A preliminary report embodying some of the facts hereinabove set forth has been published in Cereal Chemistry, vol. 17, no. 2, pp. 243–45, March 1940.

Having thus described our invention, we claim:

1. The process comprising mixing a fat solvent with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the solvent of the solution and dissolving in ether the residue resulting therefrom; adding acetone to the ether solution to precipitate the sulphydryl-bearing fraction; and separating and recovering the precipitated fraction from the mother liquor.

2. The process comprising mixing petroleum ether with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the petroleum ether of the solution and dissolving in ether the residue resulting therefrom; adding acetone to the ether solution to precipitate the sulphydryl-bearing fraction; and separating and recovering the precipitated fraction from the mother liquor.

3. The process comprising mixing ether with a flour chosen from the group consisting of grain flour, lima bean flour, cottonseed-meal, and peanut flour, thereby obtaining a solution containing a sulphydryl-bearing fraction; separating and removing all undissolved material from the dissolved material; adding acetone to the ether solution to precipitate the sulphydryl-bearing fraction; and separating and recovering the precipitated fraction from the mother liquor.

4. The process comprising mixing a fat solvent with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the solvent of the solution and dissolving in ether the residue resulting therefrom; adding ethyl acetate to the ether solution to precipitate the sulphydryl-bearing fraction; and separating and recovering the precipitated fraction from the mother liquor.

5. The process comprising mixing a fat solvent with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the solvent of the solution and dissolving in ether the residue resulting therefrom; adding acidulated ethyl alcohol to the ether solution to precipitate the sulphydryl-bearing fraction; and separating and recovering the precipitated fraction from the mother liquor.

6. The process comprising mixing a fat solvent with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the solvent of the solution and dissolving in ether the residue resulting therefrom; adding ethyl alcohol acidulated with hydrochloric acid to the ether solution to precipitate the sulphydryl-bearing fraction; and separating and recovering the precipitated fraction from the mother liquor.

7. The process comprising mixing a fat solvent with a flour chosen from the group consisting of grain flour, lima bean flour, cottonseed-meal, and peanut flour, thereby obtaining a solution containing a sulphydryl-bearing fraction; separating and removing all undissolved material from the dissolved material; evaporating the solvent of the solution and dissolving in ether the residue resulting therefrom; adding acidulated ethyl alcohol to the ether solution to precipitate the sulphydryl-bearing fraction; separating and recovering the precipitated fraction from the mother liquor; and washing the recovered fraction with alcohol and ether.

ARNOLD K. BALLS.
WALTER S. HALE.